3,379,785
PROCESS FOR PREPARING POLYALKYL-
TETRAHYDRONAPHTHALENES
Samuel J. Kahn, Rutherford, N.J., assignor to Universal Oil Products Company, Des Plaines, Ill., a corporation of Delaware
No Drawing. Filed Nov. 24, 1965, Ser. No. 509,596
10 Claims. (Cl. 260—668)

ABSTRACT OF THE DISCLOSURE

Preparation of polyalkyltetrahydronaphthalene by gradually adding an alpha-methylstyrene and a 2,3-dimethylbutene to a mixture of cation exchange resin catalyst and a solvent maintained at a temperature of 90°–120° C.

This invention relates to a process for preparing polyalkyltetrahydronaphthalenes and more particularly to a process for preparing 1,1,3,4,4-pentamethyl-6-alkyltetrahydronaphthalenes.

Polyalkyl substituted 1,2,3,4-tetrahydronaphthalenes are valuable compounds particularly in the perfume industry, due to the fact that these compounds, upon acylation, have odors which closely resemble the highly expensive, naturally occurring macrocyclic musks such as muscone or civetone.

Heretofore, polyalkyltetrahydronaphthalenes and especially polyalkyltetrahydronaphthalenes which are acylated for use in perfumery have been prepared principally either by a cyclialkylation method such as, for example, the condensation of a 2,5-dihalo-2,5-dimethylhexane with an alkyl substituted benzene in the presence of a Friedel-Crafts catalyst or by a cyclodehydration method such as, for example, the cyclization of a tertiary alcohol such as 1,1,2,4-tetramethyl-4-(p-tolyl)-pentanol in the presence of an acid catalyst. Another method of synthesis which recently has become of interest primarily due to the fact that the specific type of polyalkyltetrahydronaphthalenes produced thereby, upon acylation, possesses an extremely desirable musk-like odor is a method which utilizes a p-cymylcarbonium ion intermediate. In this method of synthesis, a p-cymylcarbonium ion, formed either by a hydride transfer from p-isopropyltoluene, or by the addition of a proton to a dimethyl-p-tolylcarbinol or p-alpha-dimethylstyrene, is reacted in the presence of a strong acid catalyst such as concentrated sulfuric acid at a low temperature of the order of about 0° to 30° C. with olefins or alcohols such as 2,3-dimethylbutenes or 2,3-dimethyl-2-butanol to form the polyalkyltetrahydronaphthalene.

While the p-cymylcarbonium ion method of synthesis is the most straightforward method for preparing the polyalkyltetrahydronaphthalenes having the most desirable structure, namely 1,1,3,4,4,6-hexaalkyl-1,2,3,4-tetrahydronaphthalenes, for subsequent acylation to obtain compounds possessing fine musk-like odors, it nevertheless has not found wide commercial acceptance. The principal reason for this is that the reaction is extremely costly to carry out, and this is mostly due to the fact that the conversion of the very expensive reactants or product is usually very low. Moreover, even the small amount of product produced is very difficult and costly to recover in pure form from the reaction mass containing copious quantities of side products. This problem of high cost is also compounded by the fact that the unreacted, highly expensive 2,3-dimethylbutene starting material is not recoverable for reuse in any appreciable quantity because of its substantial consumption in the formation of product-contaminating side products. It has now been discovered, however, that polyalkyltetrahydronaphthalenes may be prepared according to the carbonium ion method of synthesis with high conversions of reactants and, moreover, in remarkably good yields with recoverable and reusable 2,3-dimethylbutene starting material by utilizing a cation exchange resin as a catalyst in combination with unusually high temperatures and a specific reaction procedure to effect the reaction of a substituted styrene compound and a 2,3-dimethylbutene.

Accordingly, an object of this invention is to provide a process for preparing polyalkyltetrahydronaphthalenes useful as intermediates in the preparation of acylated polyalkyltetrahydronaphthalenes having fine musk-like odors. Another object is to provide a process for preparing polyalkyltetrahydronaphthalenes involving the reaction of a substituted styrene and a 2,3-dimethylbutene which is effected at elevated temperatures in the presence of a cation exchange resin according to a specific reaction procedure whereby the tetrahydronaphthalene product is obtained economically in high yield simultaneously with readily recoverable and reusable dimethylbutene starting material. Other objects of this invention will become apparent from the following further detailed description thereof.

The polyalkyltetrahydronaphthalenes prepared according to the process of this invention may be represented by the following structural formula:

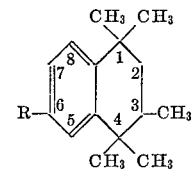

in which R is hydrogen or a lower alkyl radical of from 1 to about 5 carbon atoms. Examples of polyakyltetrahydronaphthalenes having this structure include: 1,1,3,4,4-pentamethyl-1,2,3,4-tetrahydronaphthalene; 1,1,3,4,4,6-hexamethyl-1,2,3,4-tetrahydronaphthalene; 1,1,3,4,4-pentamethyl-6-ethyl-1,2,3,4-tetrahydronaphthalene; 1,1,3,4,4-pentamethyl-6-isopropyl-1,2,3,4-tetrahydronaphthalene; or 1,1,3,4,4-pentamethyl-6-tertiarybutyl-1,2,3,4-tetrahydronaphthalene.

The polyalkyltetrahydronaphthalenes having the above general structure are prepared by reacting a substituted styrene compound with a 2,3-dimethylbutene and this reaction is effected according to the process of this invention at a temperature of from about 90° C. to 120° C. in the presence of a cation exchange resin and according to the procedure of gradually contacting both the styrene compound and the 2,3-dimethylbutene with the catalyst in the presence of a solvent. The substituted styrene compounds which may be used in this reaction have the following structural formula:

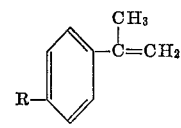

wherein R has the same meaning as is given above for the polyalkyltetrahydronaphthalene structure. Examples of the substituted styrene compounds include α-methylstyrene; p-α-dimethylstyrene; p-ethyl-α-methylstyrene; p-isopropyl-α-methylstyrene; or p-tertiarybutyl-α-methylstyrene. The styrene compound need not be of extremely high purity and, conveniently, relatively impure mixtures containing as low as 80 percent of the styrene compound may be readily utilized in the process of this invention without substantial reduction in product yield.

The 2,3-dimethylbutene reactant which may be used in the process of this invention comprises either 2,3-dimethylbutene-1 or 2,3-dimethylbutene-2 or any mixture thereof. While the 2,3-dimethylbutene-1 according to carbonium ion theory is the olefin isomer required for the polyalkyltetrahydronaphthalene formation, it is also possible to use 2,3-dimethylbutene-2 as the 2-isomer will rearrange by isomerization under the conditions of the process of this invention to form the 1-isomer. Accordingly, the 2,3-dimethylbutene reactant may comprise either the 1 or 2 isomer or any mixture thereof. A suitable 2,3-dimethylbutene reactant comprising a mixture of the 1 and 2 isomers which may be used in the reaction may be readily obtained from the dehydrohalogenation and isomerization of neohexyl chloride.

The reaction of the substituted styrene compound and the 2,3-dimethylbutene effected according to the process of this invention may be illustrated by the following equation using, for illustrative purposes only, p-α-dimethylstyrene as the styrene reactant to form 1,1,3,4,4,6-hexamethyl-1,2,3,4-tetrahydronaphthalene:

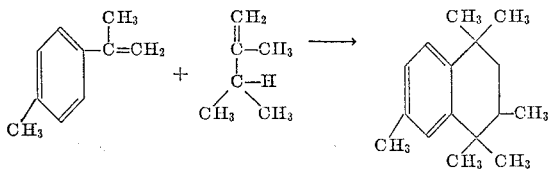

It is, of course, obvious from the above equation that different polyalkyltetrahydronaphthalenes will be produced depending upon the particular styrene compound used in the reaction. For example, if p-ethyl-α-methylstyrene is used then 1,1,3,4,4-pentamethyl-6-ethyl-1,2,3,4-tetrahydronaphthalene will be produced, and if p-isopropyl-α-methylstyrene, then 1,1,3,4,4-pentamethyl-6-isopropyl-1,2,3,4-tetrahydronaphthalene will be produced.

The catalysts which are used in combination with the elevated temperatures and reaction procedure according to the process of this invention to achieve the highly desirable result of producing excellent yields of polyalkyltetrahydronaphthalenes without simultaneously destroying the unreacted valuable 2,3-dimethylbutene starting material comprise cation exchange resins. The cation exchange resins used for this purpose are well known materials and, in general, may be defined as natural or synthetic materials which are practically insoluble in water and in organic solvents and which have polar functional groups containing labile cations which will exchange with other ions in a surrounding solution. The materials of which the resins may be made comprise a wide variety of substances and include natural materials such as coal, lignite or peat or synthetic polymeric materials such as phenol-formaldehyde polymers, polystyrene polymers or polystyrene polymers cross-linked with divinyl benzenes. The polar functional groups giving rise to the cation exchange properties of the resins include such groups as sulfonic, methylene sulfonic, carboxylic or phenolic and are incorporated into the resinous materials by a variety of treatments, or, in the case of certain synthetic polymers, are incorporated into the polymer by using a monomer in the polymerization containing the polar group. Of the many different types of cation exchange resins which may be used in the process of this invention, the synthetic polymeric materials having sulfonic or methylene sulfonic polar functional groups are the preferred cation exchange resins for use in the process of this invention. These types of cation exchange resins are available commercially in both active and unactivated forms under such trademarks as Amberlite, Dowex or Amberlyst.

In using the cation exchange resins, and preferably the synthetic resins containing sulfonic acid functional groups in the process of this invention, the conventional techniques used in ion exchange resin applications should be observed. Thus, for example, care should be taken to avoid fouling or poisoning of the resin through contamination with heavy metal salts, and, since the resins are hygroscopic, it may be necessary to dry the resins prior to use to avoid any moisture deactivation. In using the cation exchange resins, it is preferable that the resins be in a finely divided state so as to provide an adequate contacting surface area. Generally, an effective particle size for spherical shaped resins is a diameter ranging from about 0.4 to 0.6 millimeter.

The solvent which is used in the process of this invention to facilitate the reaction of the styrene compound and the 2,3-dimethylbutene preferably comprises an aromatic hydrocarbon such as, for example, benzene, toluene, ethylbenzene or a xylene. The use of such aromatic solvent at the elevated temperatures used in the process of this invention is most surprising, however, as it normally would be expected that the 2,3-dimethylbutene reactant would be consumed through alkylation of the aromatic solvent and thus would lower the product yield and preclude recovery of any unreacted 2,3-dimethylbutene not consumed in the tetrahydronaphthalene formation. Actually, however, such is not the case as there is little, if any, 2,3-dimethylbutene alkylation of the aromatic solvent, and any 2,3-dimethylbutene not reacted in the tetrahydronaphthalene formation is readily recoverable.

As hereinbefore indicated the temperature at which the reaction is effected is very important to the success of the process. The temperature which is used must be above about 90° C. and should not substantially exceed above about 120° C. The use of temperatures outside this range and, in particular, above this range results in a substantial reduction in the yield of tetrahydronaphthalene obtained. The most preferable temperature within the above range utilized for the reaction will vary, depending upon such factors as the particular reactants used, the type of solvent present in the mixture and the particular cation exchange resin catalyst utilized. Generally, however, the temperature range is preferably maintained within from about 100° C. to 115° C. for optimum results.

The use of such relatively high temperatures in the process of this invention is most surprising, however, as it was heretofore necessary in the preparation of polyalkyltetrahydronaphthalenes involving the reaction of a 2,3-dimethylbutene with styrenes to effect the reaction at very low temperatures of the order of about 0° C. to 30° C. to prevent the butenes from polymerizing and the styrenes from dimerizing to the severe detriment of the polyalkyltetrahydronaphthalene formation. A possible explanation for the successful use of high temperatures in the process of this invention is that the cation exchange resin catalyst at such temperatures in some way favors the reaction of the 2,3-dimethylbutene and the styrene to form the desired polyalkyltetrahydronaphthalene and not the side reactions of polymerization and dimerization of the reactants which deleteriously affect the tetrahydronaphthalene formation.

The ratio of the reactants used in the process of this invention is not critical, and generally a stoichiometric quantity of about one mol of the styrene compound to about one mol of the 2,3-dimethylbutene reactant may be conveniently utilized although the results are frequently improved by using a slight excess of the styrene compound. The quantity of the cation exchange resin is also not critical and the amount used will vary depending upon such factors as the particular resin used, the particle size of the resin, the polymeric structure of the resin, e.g., type of cross-linkage, the specific compounds being reacted and the reaction rate desired. Generally, however, the amount of cation exchange resin used may range from about 1 to 50 percent by weight of the 2,3-dimethylbutene reactant with amounts ranging from about 3 to 10 percent generally being more conveniently utilized. The amount of solvent, preferably an aromatic hydrocarbon such as toluene, used in the process should at least be sufficient to render the mixture of reactants and cation exchange resin readily stirrable. Generally, about one half to one weight part of solvent per one part of styrene compound is suitable for this purpose. Advantageously, the reaction is effected under atmospheric pressures but may, when necessitated by the particular solvent used, also be effected under super- or subatmospheric pressures.

In carrying out the process of this invention it is essential to the success of the process that a procedure be followed in which both the styrene compound and the 2,3-dimethylbutene are gradually brought into reactive contact with the cation exchange resin catalyst. In a batch-type system, this may be conveniently effected by gradually adding the styrene and the butene, either in admixture or in separate streams, to a mixture of the catalyst and solvent maintained at the desired temperature. The time required for the addition of the styrene and the butene will vary depending upon such factors as the particular reaction temperature, the reactants, the cation exchange resin catalyst used and the degree of mixing, but generally ranges from about 1 to 10 hours with addition times of from about 3 to 6 hours being more desirable at the preferred temperature range of from about 100° C. to 115° C. At the end of the addition, it is not generally necessary to continue the heating of the reaction mixture for any substantial period as the reaction, by then, is usually complete. It may be necessary in certain instances, however, and particularly when using low reaction temperatures and short addition periods, to finish the reaction after completion of the addition by continuing the heating of the reaction mixture within the desired temperature range for a short additional period of from about one-half to one hour.

When the reaction is complete, the product mixture is separated from the cation exchange resin catalyst by conventional methods such as decantation or filtration which, because the catalyst used in the process is a solid, is readily and economically achieved. Because of the uniqueness of the process of this invention which permits the formation of large quantities of tetrahydronaphthalene product without destruction of the valuable unreacted 2,3-dimethylbutene in forming large amounts of tetrahydronaphthalene contaminating side products, the tetrahydronaphthalene product, the unreacted 2,3-dimethylbutene and the solvent may be readily recovered from the catalyst-free product mixture by simple fractionation. The tetrahydronaphthalene product fraction may then be recrystallized from a solvent such as isopropyl alcohol to obtain a high yield of pure polyalkyltetrahydronaphthalene.

As hereinbefore indicated, the process of this invention, effected with a cation exchange resin at highly elevated temperatures and according to a specific reaction procedure, has the amazing characteristic of permitting the reaction to take place principally between the styrene and the 2,3-dimethylbutene to form the desired polyalkyltetrahydronaphthalene with low loss of the unreacted 2,3-dimethylbutene through side product formation or alkylation of the aromatic solvent. This results in the highly desirable feature of being able to recover the 2,3-dimethylbutene for reuse which adds considerably to the overall desirability of the process of this invention by greatly lowering the cost of preparing polyalkyltetrahydronaphthalenes.

The polyalkyltetrahydronaphthalenes prepared according to the process of this invention, as hereinbefore indicated, may be acylated to obtain acylated polyalkyltetrahydronaphthalenes having very fine, musk-like odors which render them highly valuable for use in perfumery. The acylation may be effected according to conventional methods such as by reacting the polyalkyltetrahydronaphthalene with an acyl halide or acid anhydride in the presence of an acid-acting catalyst. Examples of the acylated polyalkyltetrahydronaphthalenes include 7-acetyl-1,1,3,4,4,6-hexamethyl-1,2,3,4-tetrahydronaphthalene or 7-acetyl-1,1,3,4,4 - pentamethyl - 6 - ethyl - 1,2,3,4 - tetrahydronaphthalene.

The following examples are given to illustrate the process of this invention, but they are not intended to limit the generally broad scope of this invention in strict accordance therewith:

EXAMPLE I 1,1,3,4,4,6-hexamethyl - 1,2,3,4 - tetrahydronaphthalene was prepared according to the process of this invention by the following procedure:

About 875 grams of toluene and about 35 grams of a cation exchange resin containing sulfonic acid functional groups (Amberlyst 15) were charged to a reaction flask equipped with heating and stirring means. The temperature of the slurry was raised to about 102° C. and with stirring a mixture comprising about 975 grams of p-α-dimethylstyrene (88 percent by weight, 6.5 mols) and about 442 grams of an olefinic mixture containing 95 percent by weight of a mixture of the 1 and 2 isomers of 2,3-dimethylbutene (5.0 mols) was gradually added over a period of about 5 hours with the temperature rising up to about 103° C. at the end of the addition. The reaction mixture was then refluxed for a short period (about one-half hour) after the end of the addition and thereafter cooled to about 25° C. The liquid reaction product was decanted from the catalyst layer to recover about 2287 grams of a liquid product mixture. The mixture was treated with about 3 grams of sodium carbonate and then fractionated under vacuum to recover about 1010 grams of a toluene-2,3-dimethylbutene fraction analyzing by Gas-Liquid Chromatography (G.L.C.) as containing 21.6 percent of 2,3-dimethylbutenes or 2.59 mols and about 459 grams of a product fraction analyzing by G.L.C. as containing 69.1 percent of tetrahydronaphthalene or 1.465 mols. Accordingly, the yield of tetrahydronaphthalene on consumed 2,3-dimethylbutene was 60.7 percent and the conversion was 29.3 percent.

The tetrahydronaphthalene product was recovered from the product fraction by mixing the fraction with about 450 grams of isopropyl alcohol at 30° C. followed by cooling to about 0° C. The solid tetrahydronaphthalene product was then filtered from the alcohol solution and dried to recover about 266 grams of 1,1,3,4,4,6-hexamethyl-1,2,3,4-tetrahydronaphthalene of 99 percent purity having a melting point of 65° C. to 66° C.

EXAMPLE II 1,1,3,4,4 - Pentamethyl - 6 - ethyl - 1,2,3,4 - tetrahydronaphthalene is prepared according to the process of this invention by the following procedure:

About 875 grams of toluene and about 35 grams of a cation exchange resin containing sulfonic acid functional groups are charged to a reaction flask equipped with heating and stirring means. The temperature of the slurry is raised to about 100° C. and with stirring a mixture comprising about 950 grams of p-ethyl-α-methylstyrene (6.5 moles) and about 442 grams of an olefinic mixture containing 95 percent by weight of a mixture of the 1 and 2 isomers of 2,3-dimethylbutene (5.0 moles) is gradually added over a period of about 5 hours. After the addition is complete the reaction mixture is then refluxed for a short period (about one-half hour) and thereafter cooled to about 25° C. The liquid reaction product is decanted from the catalyst layer to recover a liquid product mixture which is treated with about 5 grams of sodium carbonate and then fractionated under vacuum to recover a toluene-2,3-dimethylbutene fraction and a product fraction boiling at 102–105° C. at 2 mm. Hg and having a refractive index of $n_D^{20}$ 1.515–1.516.

I claim as my invention:

1. A process for preparing a polyalkyltetrahydronaphthalene of the formula:

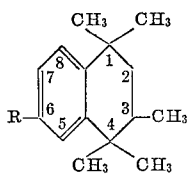

where R is a substituent selected from the group consisting of hydrogen and an alkyl radical of from 1 to about 5 carbon atoms which comprises gradually adding an α-methylstyrene substituted in the para position with an R substituent as defined above and a 2,3-dimethylbutene to a mixture of a catalyst comprising a cation exchange resin and a solvent maintained at a temperature of from about 90° C. to 120° C., reacting said styrene and butene at said temperature, and thereafter recovering the polyalkyltetrahydronaphthalene from the reaction mixture.

2. The process according to claim 1 wherein the styrene compound is p-α-dimethylstyrene and the polyalkyltetrahydronaphthalene prepared is 1,1,3,4,4,6-hexamethyl-1,2,3,4-tetrahydronaphthalene.

3. The process according to claim 1 wherein the 2,3-dimethylbutene comprises a mixture of 2,3-dimethylbutene-1 and 2,3-dimethylbutene-2.

4. The process according to claim 1 wherein the catalyst comprises a cation exchange resin having sulfonic acid functional groups.

5. The process according to claim 1 wherein the solvent is an aromatic hydrocarbon.

6. The process according to claim 1 wherein the styrene compound and the 2,3-dimethylbutene are gradually contacted with the catalyst by adding the styrene compound and the 2,3-dimethylbutene to a mixture of the solvent and the catalyst over a period of from about 1 to 10 hours.

7. The process according to claim 1 wherein the temperature is from about 100° C. to 115° C.

8. The process according to claim 1 wherein 1,1,3,4,4,6-hexamethyl-1,2,3,4-tetrahydronaphthalene is prepared by gradually adding p-α-dimethylstyrene and a 2,3-dimethylbutene comprising a mixture of the 1 and 2 isomers thereof over a period of from about 1 to 10 hours to a mixture of an aromatic hydrocarbon solvent and a catalyst comprising a cation exchange resin having sulfonic acid functional groups at a temperature of from about 90° C. to 120° C. and thereafter recovering the hexamethyltetrahydronaphthalene from the reaction mixture.

9. The process according to claim 8 wherein the aromatic hydrocarbon solvent is toluene.

10. The process according to claim 8 wherein the 2,3-dimethylbutene and the p-α-dimethylstyrene are gradually added over a period of from about 3 to 6 hours and at a temperature of from about 100° C. to 115° C.

References Cited

UNITED STATES PATENTS

| 2,851,501 | 9/1958 | Benz et al. | 260—668 |
| 3,037,052 | 5/1962 | Bortnick | 260—671 XR |
| 3,161,692 | 12/1964 | McLaughlin et al. | 260—669 XR |
| 3,246,044 | 4/1966 | Wood et al. | 260—668 |
| 3,278,621 | 10/1966 | Stofberg et al. | 260—668 |

OTHER REFERENCES

Wood et al., J. Org. Chem., vol. 28, September 1963, pp. 2248–2255.

DELBERT E. GANTZ, *Primary Examiner.*

C. R. DAVIS, *Assistant Examiner.*